Figure 1:
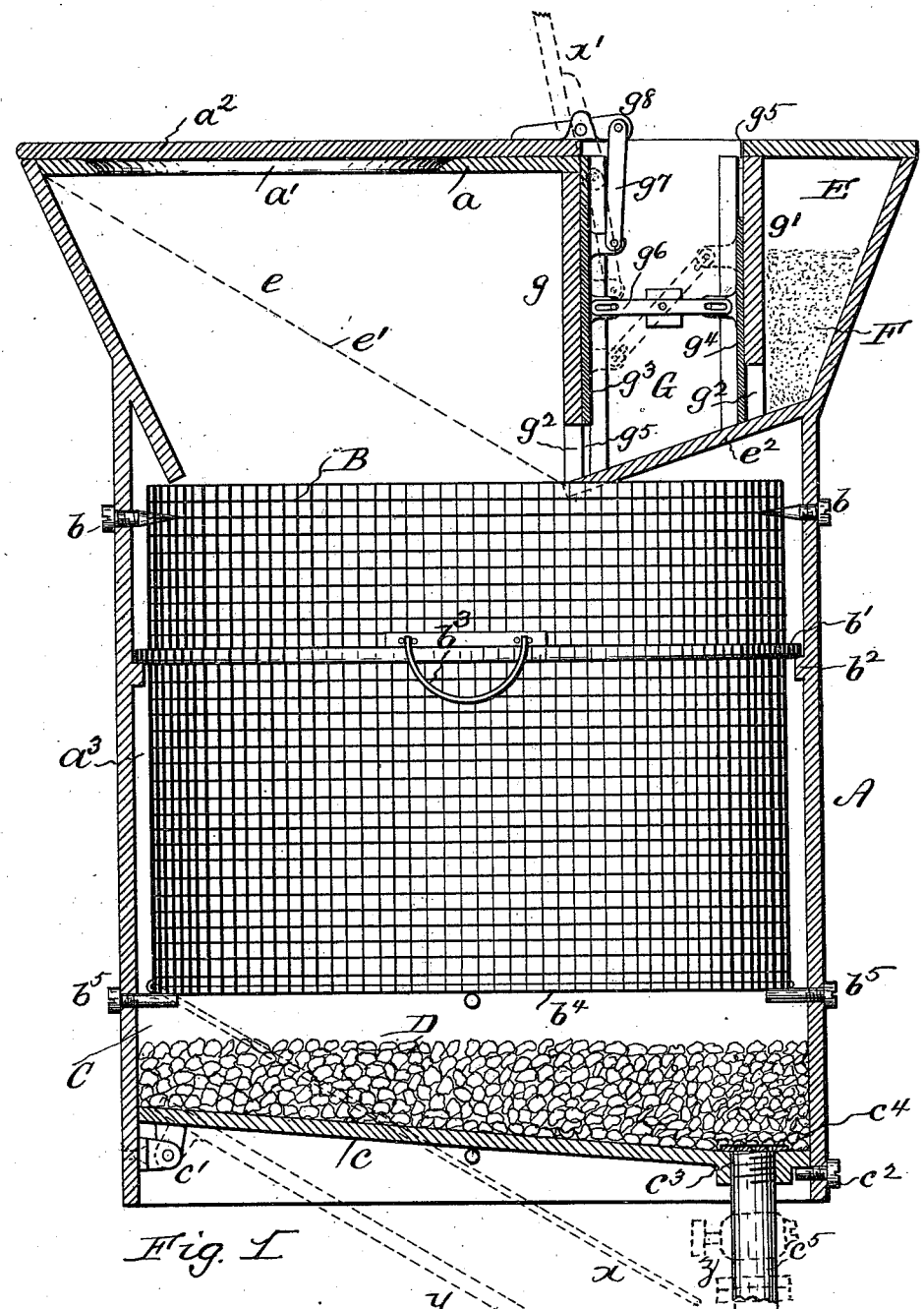

(No Model.) 3 Sheets—Sheet 1.

O. D. McCLELLAN.
FECULENT RECEIVER.

No. 408,506. Patented Aug. 6, 1889.

Fig. I.

WITNESSES:

INVENTOR
Oscar D. McClellan
By S. J. VanStavoren
ATTORNEY (No Model.)  3 Sheets—Sheet 2.

O. D. McCLELLAN.
FECULENT RECEIVER.

No. 408,506.  Patented Aug. 6, 1889.

WITNESSES:  INVENTOR,
Oscar D. McClellan
By S. J. Van Stavoren
ATTORNEY (No Model.) 3 Sheets—Sheet 3.

O. D. McCLELLAN.
FECULENT RECEIVER.

No. 408,506. Patented Aug. 6, 1889.

WITNESSES:

INVENTOR,
Oscar D. McClellan
By S. J. VanStavoren
ATTORNEY

UNITED STATES PATENT OFFICE.

OSCAR D. McCLELLAN, OF PHILADELPHIA, PENNSYLVANIA, ASSIGNOR, BY MESNE ASSIGNMENTS, TO THE SANITARY AND FERTILIZER COMPANY OF THE UNITED STATES, OF SAME PLACE.

FECULENT RECEIVER.

SPECIFICATION forming part of Letters Patent No. 408,506, dated August 6, 1889.

Application filed November 14, 1888. Serial No. 290,778. (No model.)

*To all whom it may concern:*

Be it known that I, OSCAR D. MCCLELLAN, a citizen of the United States, residing at Philadelphia, in the county of Philadelphia and State of Pennsylvania, have invented certain new and useful Improvements in Feculent Receivers, of which the following is a specification.

This invention has relation to one part of a system of sanitary appliances and mechanical devices for effecting the removal of liquid and solid human or other feculent matter in such manner that putrefaction of its organic matter is prevented and decomposition of the same effected without detriment to public health, and for so treating such material that it is converted into a valuable fertilizing agent.

It is now well known that the most important object to be achieved in the removal of human or other feculent matter is to prevent putrefaction, and at the same time secure decomposition of the organic elements of the feculent matter in the sanitary appliances used for effecting its removal, for the reason that the putrefaction is offensive and, as is well known, generates sewer or other deleterious gases and disease-germs, which are extremely prejudicial to individual and public health.

In the sanitary appliances now employed the feculent matter is commonly commingled with water to flush the same through the appliances. The water, however, does not prevent putrefaction. On the contrary, as it does not absorb or decompose the organic elements, the putrefaction is maintained and the generation of the deleterious gases and disease-germs is continuous. In many cases chemicals or antiseptics have been commingled with the water; but their use does not prevent putrefaction, but only tends to kill or render harmless a portion of the sewer or other gases and the germs arising from the putrefaction. It is also now well known that in treating human or other feculent matter for use as a fertilizer it is important to effect the removal of the organic materials held in suspension in the liquid matter to prevent the escape of the volatile salts of ammonia from both the liquid and the solid matter and to decompose the organic matter in order to enhance the efficiency of the same as a fertilizer, and, further, to bring it to or convert it into a dry and granular condition, as in its raw state it is unfit for use as a fertilizer, owing to the offensive and deleterious odors emanating therefrom, and to the fact that as it is not granular in condition it chokes up the soil and renders it impervious to the air.

The use of chemicals only to obtain the above-described results is a detriment instead of a benefit, for the reason that if they are used in sufficient quantities to destroy the disease organisms they effectually check the growth of those organisms upon which the fertility of the soil depends. With the sanitary appliances and devices comprising my improvements the liquid matter is separated from the solids and the organic matter in the liquids precipitated, and it, together with the corresponding matter in the solids, is decomposed and prevented from putrefying. The odors of the solid matter are absorbed, and the liquid, after it is separated from the solids, is passed through a chamber containing a compound which precipitates and decomposes all its foreign and organic matter and renders it perfectly clear, inodorous, and inorganic, and in this condition is conveyed away, so that nothing dangerous to health escapes from the appliances, and the feculent material contained therein is in a dry state and in a granular condition for use as a fertilizer.

I do not herein claim the general method of treating human feculent matter as above described as the same forms the subject-matter of another pending application filed November 17, 1888, Serial No. 291,131. My present improvements refer to a receptacle or receiver which takes the place of the present water-closets and receives the feculent matter, and in which the treatment of the same is automatically effected to produce the results above set forth.

My present improvements therefore consist in the combinations, constructions, and arrangements of parts comprising a human or other feculent matter receiver or receptacle arranged to separate the solid from the liquid feculent matter, to deodorize and decompose the solids, and to precipitate and decompose the foreign and organic matter of the liquids after separation from the solids, and discharge such liquids in a pure and inorganic condition, as hereinafter described in the specification and pointed out in the claims.

Figure 2:
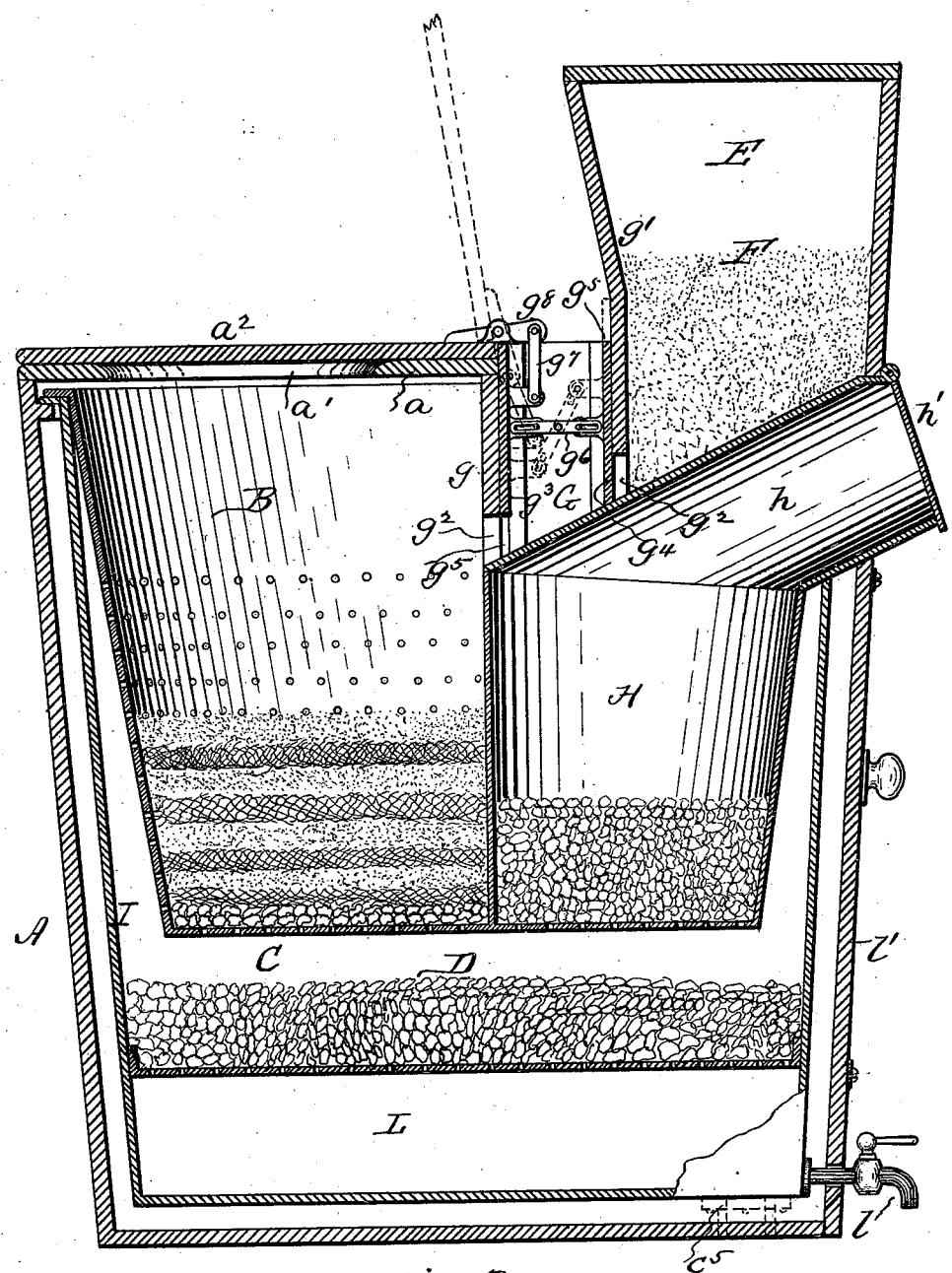
Figure 3:
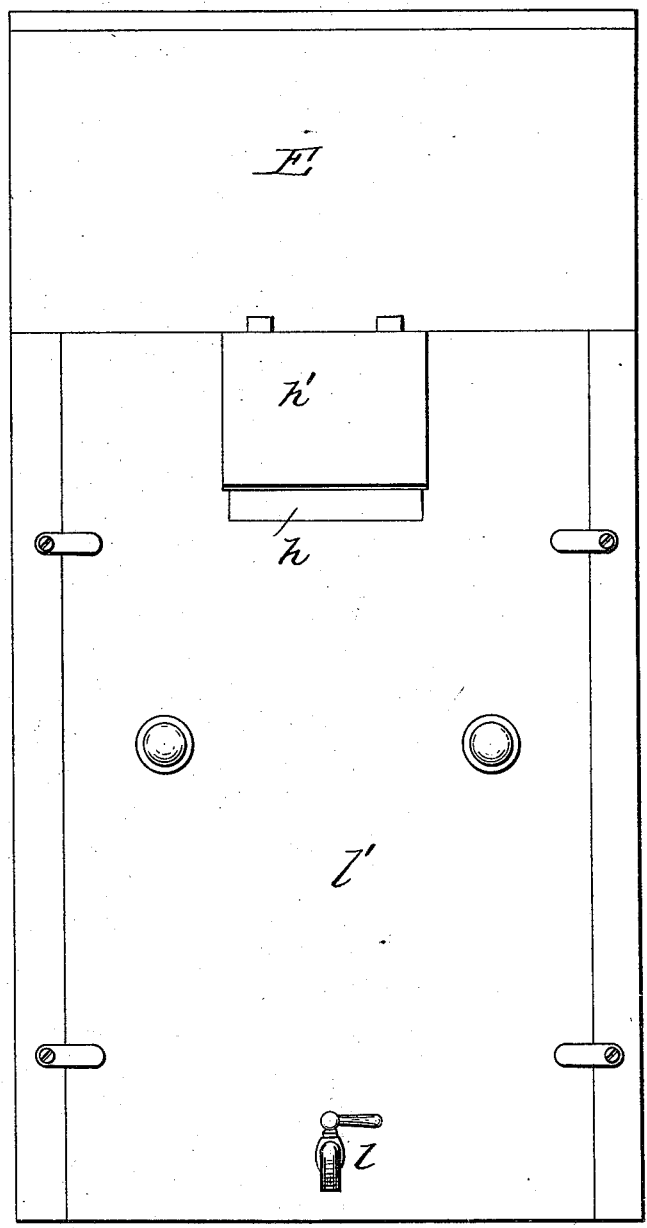

Reference being had to the accompanying drawings, Figure 1 is a vertical section, partly in elevation, of one form of receiver embodying my invention. Fig. 2 is a like view of another form of same, and Fig. 3 is an elevation of one side of the receiver shown in Fig. 2 and illustrating a removable door or cover in said side.

A represents a casing of any suitable material, which is of any suitable form or configuration, having a seat $a$, with opening $a'$, and a seat-lid $a^2$, hinged to the casing in any suitable manner.

Within the casing A is a removable receptacle B, of, preferably, inoxidizable material, and is of a smaller size than the interior measurement of the casing, so as to provide a space $a^3$ between the casing and receptacle. The latter has perforated sides and bottom and an open top. This receptacle, as shown in Fig. 1, may be made of wire or other suitable material, so that the perforations therein are formed as the receptacle is made; but it may be otherwise constructed, as desired. The receptacle B is suspended within the casing either by bolts, clasps, or other equivalent removable devices $b$, passing through the sides of the casing, or by means of overlapping flanges $b'$ and $b^2$, respectively secured to the receptacle and casing, or both said clasps and flanges may be used, as shown in said figure.

If desired, the receptacle B is provided with handles $b^3$, to facilitate insertion into and withdrawal from the casing A. The receiver B (shown in Fig. 1) has a hinged bottom $b^4$, which is held up against the bottom edge of the receptacle B by removable screw-bolts, clasps, or equivalent devices $b^5$, passing through the walls of the casing and engaging with said bottom, as shown, so that when said bolts or devices $b^5$ are withdrawn the bottom $b^4$ falls or opens, as indicated by dotted line $x$, Fig. 1. The bottom $c$ of casing A is located at a suitable distance below the bottom of receptacle B, so as to provide a chamber C between the receptacle B and said casing-bottom $c$. The latter is inclined, as shown, and is hinged, as indicated at $c'$, to one side of the casing A, so as to admit of dropping said bottom $c$ when desired and as hereinafter set forth, as indicated by dotted line $y$, Fig. 1.

The bottom $c$ may be so constructed that when raised to its normal position it finds its own joint, which is water-tight, with the casing, or suitable packing may be provided for making such joint water-tight. Said bottom is held in its raised position by means of screws or clasps or equivalent devices $c^2$, passing through the walls of the casing and engaging with the bottom $c$. The bottom $c$ has at its lowest end or level an opening $c^3$, covered by a strainer or perforated plate $c^4$, and is provided with a pipe-connection $c^5$ with the sewer cesspool or other drain, such connection being made so that the receiver A is attachable to and detachable from said pipe $c^5$, and when detached therefrom a suitable plug is inserted in opening $c^3$ to prevent escape of drip.

If desired, the pipe $c^5$ may be a permanent part of the bottom $c$, and be provided with a cut-off or valve, and be coupled to the sewer or drain pipe, as indicated by dotted lines $z$, Fig. 1.

Within chamber C is located a suitable precipitating or filtering compound D, composed of a mixture of clay and alum; or equivalent compounds may be substituted, if desired.

Back of seat $a$ and above receptacle B is a chamber E, which, if desired, may have side pockets $e$, as indicated by dotted line $e'$ in Fig. 1, to increase the capacity of said chamber, which holds the deodorizing and absorbing compound F, consisting of a mixture of pulverized slag or coke and sulphates of lime, or other materials, as hereinafter described, may be substituted, a charge of which is to be ejected into receptacle B upon the feculent material after it is deposited therein. Any suitable mechanical devices controlled by the raising and dropping of the seat-lid $a^2$ for effecting such discharge may be used.

In the drawings I have shown a charging-chamber G located between chamber E and the depending seat-wall $g$, the bottom of which is formed by the inclined chute $e^2$, leading from chamber E. Said chamber G may be closed at its top, if desired.

At the bottom of the walls $g\ g'$ of chamber G are openings $g^2$, which are alternately covered by valves or slides $g^3\ g^4$, respectively. These slides move up and down in guides $g^5$, and are jointed to or engage with a pivoted bar $g^6$, one of said slides $g^3$ being connected by a link $g^7$ to a lug $g^8$ on the seat-lid $a^2$, as shown. When the seat-lid $a^2$ is raised, as indicated by dotted lines $x'$ in Fig. 1, the slide $g^4$ is raised to uncover the opening $g^2$ in wall $g'$, and the slide $g^3$ is lowered to close the opening $g^2$ in wall $g$. A charge of the deodorizing material F then passes into chamber G and is held therein until the seat-lid is lowered, which raises slide $g^3$ to uncover opening $g^2$ in wall $g$ and lowers slide $g^4$ to close opening $g^2$ in wall $g'$, as indicated by full lines in Fig. 1, whereupon the charge previously passed into chamber G passes out of the same and spreads itself over the top of the contents in receptacle B to deodorize the same.

In using the form of receiver shown in Fig. 1 the deodorizing material F is placed in chamber E and the filtering material D in chamber C, the bottom $b^4$ of receptacle B and bottom $c$ of casing A being first adjusted, as shown in said figure. The receiver is then attached to the sewer-pipe or other drain in the room of a building wherein it is to be located.

At each use of the receiver a charge of the deodorizing material is thrown into receptacle B upon the solid contents therein to deodorize the same, and such compound being of an earthy mixture the organic matter in said solids is decomposed and the volatile salts are absorbed. Meanwhile the liquid matter passes through the perforations of receptacle B, drips into the chamber C, and percolates through the compound D, the alum of which precipitates all the foreign and organic matter in the liquid, and the clay or equivalent material decomposes such organic matter, so that the liquid becomes perfectly pure and inorganic and finds its way through the pipe $c^5$ to the sewer or drain. No putrefaction of the feculent matter therefore occurs either in the receiver A or in the drain-pipes, and no deleterious gases or disease-germs emanate therefrom, and no polluted matter is conveyed through the sewers to pollute rivers or streams the water of which is used for domestic or other purposes. As the liquid matter separates from the solids in the receiver, such solid matter is always more or less dry. When the receiver A is used to its capacity, it is removed and a new one is substituted. The filled receiver is then conveyed to a suitable place, and by dropping the hinged bottoms $c$ and $b^4$ its contents, including the compound D, fall out of the receiver. Said contents may be emptied into suitable treating appliances—such as grinding and drying devices—to further communicate and dry the same; but if sufficiently dry no further treatment is required, as they are in a suitable condition for use as a fertilizer, owing to the fact that the organic matter is decomposed, and the earthy and porous nature of the compounds D and F used impart to the feculent matter the necessary granular condition to render the soil pervious to the air.

If desired, a separate chamber H, forming a part of receptacle B, or separate therefrom, may be used, as indicated in Fig. 2, in which case the chamber H is alone used for liquid matter, and it is charged with the precipitating and decomposing compound D, and has an inlet end $h$ outside of the casing A, closed by a hinged cap or cover $h'$. In this figure I have shown the receptacle B without the hinged bottom and located within another receptacle I, both being supported from their top edges by means of flanges overlapping a flange on the interior of the casing.

Below the receptacle B and chamber H is the precipitating and decomposing chamber C, having a perforated removable bottom instead of a hinged bottom, and below chamber C is a closed chamber L for the pure and inorganic water, said chamber L having a spigot or valved outlet $l$, for drawing off such water from time to time. In this construction one side $l'$ of the casing A and its top part, including the chamber E, are removable to admit of placing the receptacles B, H, and I within the casing A and removing them therefrom. Such removable side $l'$ is more plainly shown in Fig. 3. This last-described form is a preferable one for use when the receiver is not connected to a sewer or outlet pipe; but, if desired, by dispensing with the spigot $l$ and providing a coupling-pipe $c^5$ for the bottom of receptacle I, the receiver may be attached to and detached from the sewer or drain pipe. For many locations and for ease in treating or manipulating the refuse after it is removed from the receiver I prefer to use the last-described form; but it is obvious that various constructions of receivers can be employed without departing from the spirit of my invention; hence I do not confine myself to the constructions shown and described.

I have stated that the deodorizing and absorbing compound F may consist of pulverized slag and sulphate of lime; but, if desired, a small portion of sulphate of magnesia may be used in place of the lime, or coke and sulphate of lime may be employed, or sulphate of lime and magnesia may be mixed with the coke or slag. In any case but a small proportion of the sulphate of lime or magnesia is mixed with the slag or coke. I do not, however, limit myself to the above-named ingredients, inasmuch as "kainit" combined with sifted ashes or coal-dust in proper proportions can be applied, all of which not only act as deodorizers and absorbents, but add materially to the value of the feculent material when mixed with it for fertilizing purposes.

It is well known that in breweries, slaughter-houses, dye-works, and glue and analogous factories large quantities of semi-fluid and fluid refuse containing varying quantities of organic matter held in suspension are produced, from which it is necessary to separate the organic matter as well as the solids from the liquid, and as this separation can be attained by the use of the above-described receiver without putrefaction of the organic matter, and consequently without contamination of the sewers or drain-pipes leading from said places, I do not limit my improvements for use to sanitary fixtures only. Furthermore, as it is well known that there is no filtering process that can free water from the germs of typhus fever and other similar poisonous matter when communicated to the water through an infected and putrefactive sewage, and that the excrement of typhoid and cholera patients does not become dangerous to others until putrefaction has set in, and as it is the mixing of human or other excrement with water in water-closets and cesspools that maintains putrefaction, the appliances herein described prevent such action, and as they allow nothing to pass into the sewer except imputrescible water the rivers into which such sewers drain are not contaminated by typhus or other germs, as is now the case.

I am aware that dry closets have been provided with absorbent materials to take up part of the liquid accompanying excreta; but such devices differ from mine in that the liquids are not separated from the solids, so that both can be treated separately. I am also aware that in some forms of dry closets the liquids are separated from the solids; but in such cases the liquids are not treated after separation from the solids. I am also aware that sewage has been treated so that the solids are separated from the liquids and the latter treated with lime in filtering-chambers; but as is well known the lime treatment causes the precipitated solid matters to be valueless as a fertilizing agent. I am also aware that charcoal-filtering devices have been employed in connection with feculent-matter receivers in which the liquids are separated from the solids. To all of these constructions I make no claim, as my device differs from them in that in one vessel or receiver the excrement and urine are deposited in a perforated chamber, to which is ejected a pulverulent material which acts upon the excrement to absorb the volatile gases and decompose the organic ingredients thereof, the liquid material passing out of said perforated chamber into a sub-chamber, wherein its saline and organic matter are precipitated and subsequently decomposed, and the water of such liquid matter is allowed to escape from said chamber, and putrefaction in both of said chambers is avoided.

What I claim is—

1. A feculent-matter receiver having a receptacle for receiving and separating the liquid from the solid matter and for detaining the solid matter and decomposing its organic ingredients, a chamber for such separated liquid having a precipitating and decomposing compound for the organic matter in such liquid, and an outlet from said liquid-receiving chamber, substantially as set forth.

2. A feculent-matter receiver having a receptacle for receiving and separating the liquid from the solid matter and for detaining the solid matter and decomposing its organic ingredients, a chamber for such separated liquid having a precipitating and decomposing compound comprising alum as an ingredient thereof, and an outlet from said liquid-receiving chamber, substantially as set forth.

3. A feculent-matter receiver comprising a perforated receptacle B, a chamber C below said receptacle, a precipitating and decomposing compound in chamber C, and an outlet-pipe having a coupling-connection for attachment to and detachment from a sewer or other drain-pipe, substantially as set forth.

4. The casing or receiver A, having a seat $a$, seat-lid $a^2$, and chambers E and G, with openings and valves for said openings controlled by the movement of lid $a^2$, a perforated receptacle B, a chamber C below receptacle B, a precipitating and decomposing compound in chamber C, and an outlet-pipe for the latter, substantially as set forth.

5. A feculent-matter receiver having a chamber for holding a charge of deodorizing and absorbing compound, a perforated receptacle, mechanism for ejecting said compound into said receptacle, a chamber C below receptacle B and within the receiver, a precipitating and decomposing compound in chamber C, and an outlet-pipe for the latter, substantially as set forth.

6. The combination, with receiver A, having lid $a^3$ and seat $a$, of chamber E, valved mechanism between said chamber and lid, perforated receptacles B and H, receptacle I, having chambers C and L, and outlet for the latter, substantially as set forth.

7. In a feculent-matter receiver, a receptacle divided into two chambers by a perforated partition, the upper chamber containing a pulverulent material and the lower chamber a precipitating and decomposing compound, and provided with a drain or outlet, substantially as set forth.

In testimony whereof I affix my signature in presence of two witnesses.

OSCAR D. McCLELLAN.

Witnesses:
S. J. VAN STAVOREN,
CHAS. F. VAN HORN.